United States Patent [19]

Yount

[11] Patent Number: 4,622,667
[45] Date of Patent: Nov. 11, 1986

[54] DIGITAL FAIL OPERATIONAL AUTOMATIC FLIGHT CONTROL SYSTEM UTILIZING REDUNDANT DISSIMILAR DATA PROCESSING

[75] Inventor: Larry J. Yount, Scottsdale, Ariz.

[73] Assignee: Sperry Corporation, New York, N.Y.

[21] Appl. No.: 675,154

[22] Filed: Nov. 27, 1984

[51] Int. Cl.[4] ...................... G06F 11/16; G06F 15/16
[52] U.S. Cl. .......................................... 371/9; 371/68;
364/184; 364/434
[58] Field of Search ...................... 364/184, 187, 434;
371/68, 37, 9; 244/194

[56] References Cited

U.S. PATENT DOCUMENTS

| | | | |
|---|---|---|---|
| 3,783,250 | 1/1974 | Fletcher et al. | 371/9 |
| 3,833,798 | 9/1974 | Huber et al. | 371/9 |
| 3,931,505 | 1/1976 | Sevcik | 371/68 |
| 4,032,757 | 6/1977 | Eccles | 371/9 |
| 4,130,241 | 12/1978 | Meredith et al. | 371/68 |
| 4,198,678 | 4/1980 | Maatje et al. | 364/426 |
| 4,217,486 | 8/1980 | Tawfik et al. | 371/68 |
| 4,313,201 | 1/1982 | Fischer et al. | 244/194 X |
| 4,327,437 | 4/1982 | Gelderloos | 371/68 |
| 4,472,780 | 9/1984 | Chenoweth et al. | 364/434 |
| 4,497,059 | 1/1985 | Smith | 371/36 |

*Primary Examiner*—Felix D. Gruber
*Assistant Examiner*—Thomas G. Black
*Attorney, Agent, or Firm*—Howard P. Terry; Albert B. Cooper

[57] ABSTRACT

An automatic flight control system that is software fault tolerant fail operational in response to a first generic failure utilizes two independent subsystems each including a dual channel flight control computer. One channel in each flight control computer includes a digital processor and the other channel includes two digital processors. Cross channel monitoring is included in each flight control computer to discern disagreements between the outputs of the channels. If disagreement occurs between one of the two processing elements in the channel including two processing elements and the processing element of the channel having one processing element, the involved processing element in the two-element channel is disabled. If both processing elements in the two element channel disagree with the processing element in the other channel, the subsystem is disabled. All of the processing elements perform identical tasks. The three processing elements in each subsystem provide dissimilar data processing with respect to each other. The processing elements in the single element channels provide dissimilar data processing with respect to each other. Only three unique types of dissimilar data processing are utilized.

24 Claims, 6 Drawing Figures

DIGITAL FAIL OPERATIONAL AUTOMATIC FLIGHT CONTROL SYSTEM UTILIZING REDUNDANT DISSIMILAR DATA PROCESSING

BACKGROUND OF THE INVENTION

1. Field of the Invention

The invention relates to automatic flight control systems utilizing digital flight control computers, particularly with respect to utilizing redundant dissimilar digital data processing to reduce safety hazards resulting from generic faults in the software or the processors.

2. Description of the Prior Art

Automatic flight control systems are constrained by Federal Air Regulations to provide safe control of the aircraft throughout the regimes in which the automatic flight control system is utilized. Any failure condition which prevents continued safe flight and landing must be extremely improbable. Present day regulations require a probability of less than $10^{-9}$ failures per hour for flight critical components. A flight critical portion of an automatic flight control system is one, the failure of which will endanger the lives of the persons aboard the aircraft. Generally, the safety level of components of the system is determined by analysis, testing and field history procedures familiar to those skilled in the art. Such procedures are often referred to as verification and validation. Analysis of non-critical flight control system elements, however, typically need only be performed to at most a level of $10^{-7}$ failures per hour. For example, components of an automatic flight control system utilized in automatically landing the aircraft may be designated as flight critical, whereas, certain components utilized during cruise control may be designated as non-critical.

Automatic flight control systems utilizing analog computers and components had been prevalent in the art wherein it had been completely practical to perform the verification and validation procedures to certify conformance of such systems to the safety requirements of the Federal Air Regulations. Traditionally, such analog systems utilized independent control of the aircraft axes by providing, for example, independent pitch and roll control channels. Certification analysis was facilitated by the axis independent control. A hardover failure, for example, in the pitch or roll axis affected only that axis.

A known technique for enhancing automatic flight control system reliability is that of dual redundancy. Dual redundancy is the utilization of two identical channels with cross channel monitoring to detect a failure in one of the channels. Although such systems are effective against random faults, cross channel monitoring does not provide effective detection of generic faults. A generic fault is defined as a fault that is inadvertently designed into a component such that all like components generically have this fault and respond in a like but defective manner. When identical components having a generic fault are in respective redundant channels, the cross channel monitoring detects the same although erroneous output from both channels and therefore does not detect the error. Such generic faults are also denoted as design errors. In the prior art, in order to satisfy the Federal Air Regulations, the absence of generic faults was traditionally proven by analysis and testing to the required level.

Such prior art dual redundant systems with identical channels provided fail passive performance with respect to random faults. When the cross-channel monitoring detected different outputs from the two channels, the dual channel automatic flight control system was disengaged thereby failing in a passive manner. In order to effect fail operational performance with respect to random faults, two such dual redundant channel pairs were conventionally utilized whereby a miscomparison in one pair would result in shut down of that pair with the other channel pair remaining in operation. The occurance of a second random fault in the remaining channel pair would effect passive shut down of the system. For the reasons discussed above, such multiply redundant systems were ineffectual in detecting generic faults.

In present day technology, stored program digital computers are supplanting the analog computer of the prior art technology. It has generally been found that a digital computer including the hardware and software is of such complexity that the verification and validation analysis for certification in accordance with Federal Air Regulations is exceedingly more time consuming, expensive and difficult than with the analog computer. The level of complexity and sophistication of the digital technology is increasing to the point where analysis and proof of certification to the stringent safety requirements is approaching impossibility. Such digital systems possess an almost unlimited number of unique failure modes and indeterminable effects. To further exacerbate the difficulty, current day digital flight control computers perform all of the computations for all of the control axes of the aircraft in the same black box unlike in the analog computer approach where the control of the aircraft axes was provided by separate respective black boxes. It is appreciated that modern aircraft are stressed to withstand hardovers in the pitch axis or the roll axis but not in both axes simultaneously.

A further problem engendered by the introduction of the programmed digital computer technology into automatic flight control systems is that the extensive software required is susceptible to generic design errors. An error can arise in the definition phase of software preparation as well as in the coding thereof. A generic design error can occur in the attendant assembler or compiler as well as in the micro-code for the processor. In the prior art, in order to satisfy the stringent safety requirements of the Federal Air Regulations, exhaustive verification and validation was often utilized to prove the absence of such generic design faults in the software as well as in the processor hardware to the required level. It is appreciated that such verification and validation procedures are exceedingly time consuming and expensive. Software based redundant systems have the unique characteristic attribute of being precisely identical. Accordingly, a generic fault in, for example, detail program code or processor hardware may result in a unique set of otherwise benign time-dependent events precipitating precisely the same hazardous response in all redundant systems at precisely the same time. Thus the unique aspect of software systems to be precisely identical exacerbates the problems with generic faults in such systems.

For the reasons given above, it is appreciated that redundant identical channels of digital data processing with cross channel monitoring may not detect hardware and software generic design errors so that reliability can be certified to the required level. Furthermore, with the increasingly complex and sophisticated digital processing being incorporated into automatic flight control systems, it is approaching impossibility to prove by analysis the absence of such generic errors to the levels required by the Federal Air Regulations. It is appreciated that in a digital flight control channel, including a digital computer, sensors, input and output processing apparatus, and control servos, all of the processing for all aircraft axes are performed in the same computer and critical as well as non-critical functions are controlled by the same channel. Thus, the entire channel must be certified in accordance with the "extremely improbable" rule discussed above with respect to flight critical aspects of the system. Thus, even those portions of the system utilized for performing non-critical functions must be certified to the same level as the critical portions since the non-critical portions are within the same computation complex as the critical portions.

In order to overcome these problems, the automatic flight control technology has only recently advanced to the concept of dissimilar redundancy. In dissimilar redundancy, as currently utilized, dual dissimilar processors perform identical tasks utilizing dissimilar software with cross channel monitoring to detect failures. With this approach, a generic error designed into the processor or software of one channel will not exist in the processor or software of the other channel and the cross channel monitoring will detect the discrepancy. The remainder of the channel may then be readily analyzed to the safety levels required by the Federal Air Regulations. The dissimilar computation apparatus and software, however, need not be subject to the analysis, that, as described above, is currently approaching impossibility.

Such a prior art dual dissimilar processor system would be fail passive with respect to both random and generic faults. A random or generic fault occuring with respect to one of the dissimilar processors would be detected by the cross-channel monitoring and the dual dissimilar processor system passively disengaged.

None of the prior art system configurations discussed above provide fail operational performance with respect to generic faults. The utilization of multiple dual redundant systems with similar processing elements fails to detect generic faults for the reasons discussed above. A mere replication of dual channel subsystems utilizing dissimilar processing elements would result in a fail passive capability rather than the fail operational performance that such a system configuration would be expected to provide. This is because a generic fault detected in one dual subsystem causing that subsystem to be disengaged would be present in the corresponding element in the other subsystem also resulting in disengagement thereof. Thus this dual-dual dissimilar configuration instead of providing fail operational performance, as is expected from this system arrangement, results in a fail passive system which is the property otherwise obtainable from one half the system.

SUMMARY OF THE INVENTION

The present invention provides the first automatic flight control system that is fail operational with respect to a generic fault. The automatic flight control system of the present invention utilizes at least two independent flight control subsystems, each comprising a pair of channels. One channel in each subsystem includes a first digital data processor and the other channel includes a second digital data processor with an active third processor. The two channels in each subsystem are cross-channel monitored to detect disagreements between the outputs of the first and and second processors and the outputs of the first and third processors. All of the processors perform the same automatic flight control and/or flight director system tasks at least with respect to flight critical functions. The three processors in each subsystem provide dissimilar data processing with respect to each other. The two processors that do not have active third processors associated therewith in the respective subsystems provide dissimilar data processing with respect to each other. The six processors are arranged so that there are only three types of dissimilar data processing. When the cross-channel monitoring in a subsystem detects a discrepancy between the outputs of the first and second processors, the output of the second processor is disabled and the active third processor continues servicing its channel. If the cross-channel monitoring detects a discrepancy between the outputs of the first and second processors and the outputs of the first and third processors, the entire subsystem is disengaged. In effect, the third processor is substituted for the second processor when the second processor is detected to be defective and if the substitution does not resolve the discrepancy the subsystem is disengaged.

This arrangement provides fail operational performance for a first random or generic failure and fail passive performance for a second random or generic failure.

An alternative embodiment that is fail operational for the first two random failures and fail passive for a third random failure and which is fail operational for the first generic failure and fail passive for the second generic failure utilizes three subsystems configured in the manner described. The three processors in the respective subsystems that do not have active third processors associated therewith provide dissimilar data processing with respect to each other. The dissimilar data processing, as implemented in the present invention, may be effected by utilizing dissimilar hardware, dissimilar software or both dissimilar hardware and dissimilar software.

DESCRIPTION OF THE PREFERRED EMBODIMENTS

Figure 1:
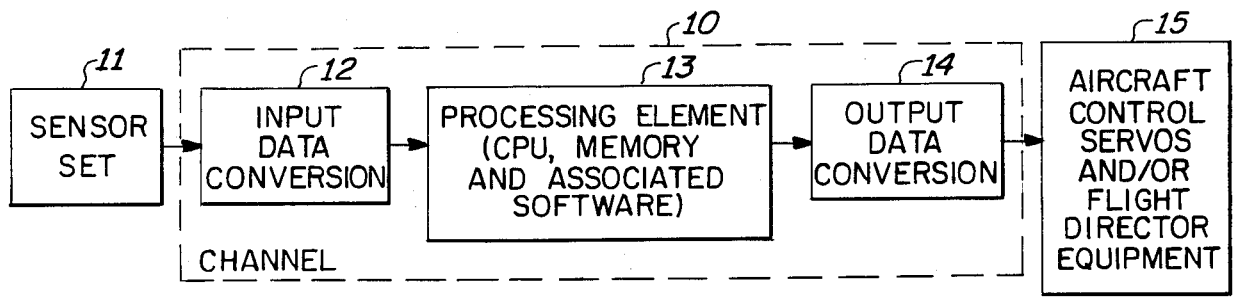
FIG. 1 is a block diagram illustrating a prior art automatic flight control system channel.

Referring to FIG. 1, the elements comprising a data processing channel 10 of an automatic flight control system are illustrated. The channnel 10 receives inputs from a sensor set 11 which may include conventional attitude, rate and acceleration sensors as well as other devices such as control wheel force sensors that are conventionally utilized in modern jet transports. The sensor set 11 may include such devices as directional and vertical gyroscopes, rate gyroscopes, and accelerometers. Preferably, the sensor set 11 will include one or more inertial reference units for providing attidude information. The sensor set 11 may additionally include conventional radio guidance equipment such as VOR, DME and ILS receivers and the like as well as radio altimeters. The sensor set 11 may also include an air data computer for providing such parameters as barometric altitude, total air temperature, airspeed and the like. A flight management system may also be included in the sensor set 11 as well as aircraft control surface position and rate transducers, such as linear variable differential transformers, synchros, and tachometers as well as engine sensors. The sensor set 11 includes the required complement of analog and digital sensors to provide signals for use in controlling the aircraft. It will be appreciated that included within the sensor set 11 are conventional analog and digital signal processing circuits for preparing the sensor signals for entry into the channel 10. Such processing circuits include demodulators for synchro data and the like.

The channel 10 includes an input data conversion portion 12 for receiving all of the signals from the sensor set 11 and converting these signals into a format suitable for application to a digital computer. The input data conversion portion 12 includes one or more conventional analog-to-digital converters for converting the analog signals from the sensor set 11 into digital format. The sensor signals from the sensor set 11 may have a variety of formats such as discrete voltage levels, variable voltage levels, amplitude modulated AC carriers, serial digital information in various formats and at various data rates and fiber optics information. The sensor data in whatever form it is provided by the sensor set is converted into the appropriate digital format for the computer. The input data conversion may, for example, include a digital bit serial to a digital bit parallel conversion, or a demodulation of a sensor signal. The analog sensor signals are voltages related to conditions existing at various locations in the aircraft or may be serial or parallel digital data from, for example, an air data computer requiring serial-to-parallel conversion and/or level shifting.

The channel 10 includes a digital processing element 13 responsive to the input signals from the input data conversion block 12. The processing element 13 includes a central processing unit (CPU), memory and computer programs (software) for performing operations upon the information provided by the sensor set 11 to produce responses to the aircraft for performing such functions as aircraft control. The channel 10 may have one or more processing elements associated therewith for reasons to be discussed.

The channel 10 also includes an output data conversion portion 14 responsive to the outputs from the digital processing element 13 for converting the computer outputs in computer format into signals suitable for providing the variety of control and display functions required in the automatic flight control system. Basically, the output data conversion portion 14 will include one or more digital-to-analog converters and additional equipment for formating the signals. The output of the output data conversion portion 14 may be discrete voltage levels, single digits, light transmission for fiber optics, serial digital transmissions, voltages for servo valves to control hydraulic actuators for the aerodynamic control surfaces of the aircraft, and the like. The output data conversion portion 14 of the channel 10 receives signals in computer format and converts these signals to whatever format is required thereof.

The outputs from the channel 10 are applied to aircraft control servos and/or flight director equipment 15 for providing conventional 3-axis control of the aircraft. The control servos and actuators may be of the well-known electro-mechanical or electro-hydraulic variety and are schematically representative of the total aircraft surface actuator system which may, in modern jet transports, be of the redundant variety. The channel 10 may also provide signals to conventional flight director instrumentation which provides visual commands to the pilot via attitude director instruments in a well known manner.

In the automatic flight control system configured in accordance with the present invention, the input data conversion electronic equipment 12 and the output data conversion electronic equipment 14 are analyzed in a conventional manner to assure the absence of generic faults to the required level. Additionally, the sensor set 11 and the airacraft control servos and/or flight director equipment 15 are configured in a traditional manner to meet the flight safety requirements of the Federal Air Regulations. The processing element 13 is utilized in a manner to be described so as to avoid effecting the traditionally required verification and validation procedures with respect thereto. Since the processing element 13 is exceedingly more complicated than the remainder of the system, it is virtually impossible to analyze so as to prove the absence of a design flaw or a generic fault to the extremely high confidence levels required by the Federal Air Regulations.

Figure 2:
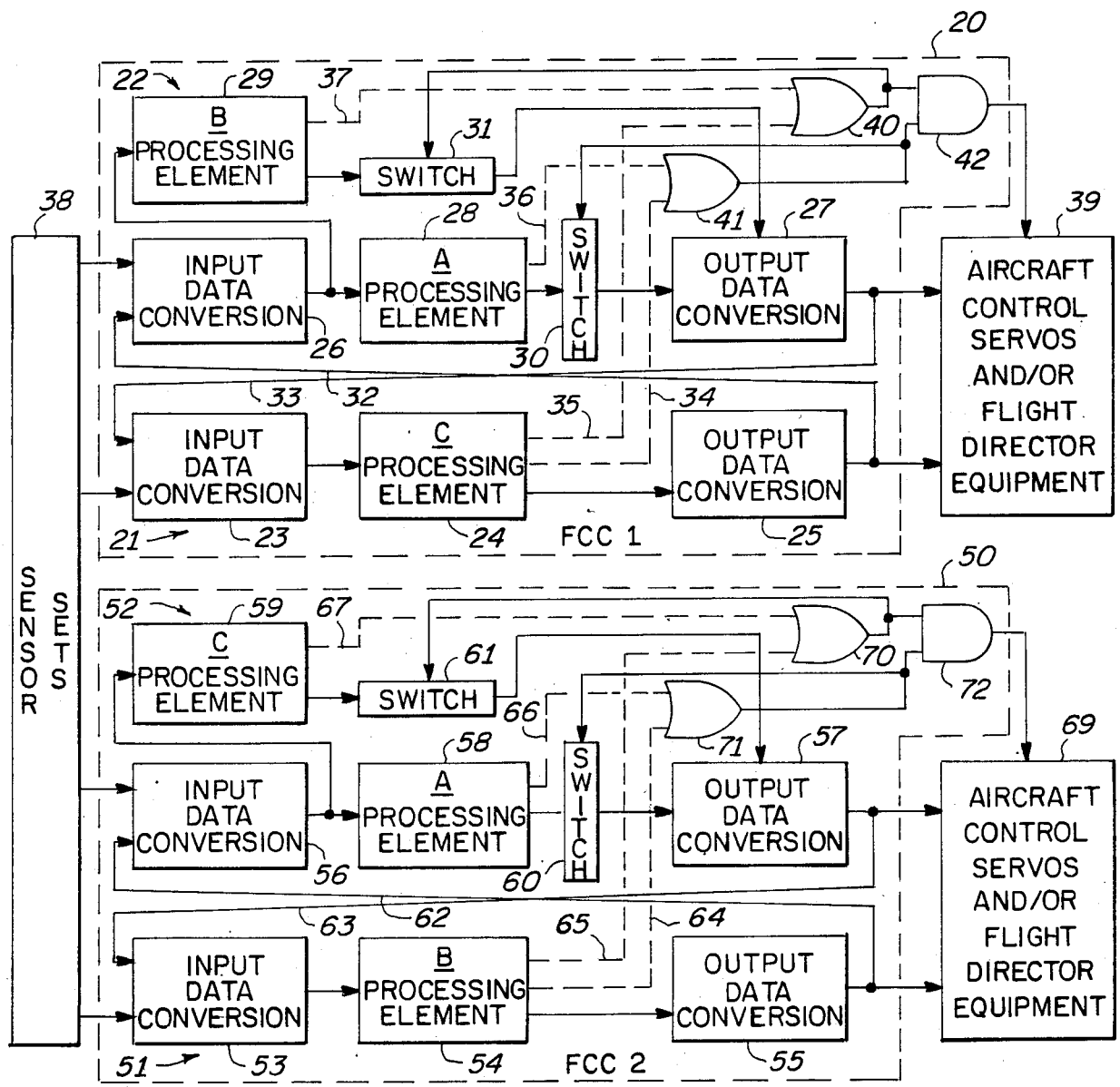
FIG. 2 is a block diagram illustrating an automatic flight control system implemented in accordance with the invention.

Referring to FIG. 2, a fail operational automatic flight control system configured in accordance with the present invention is illustrated. The automatic flight control system of FIG. 2 is a fail operational for a first generic or random fault and is fail passive for a second generic or random fault. The system includes a first flight control computer (FCC) 20 which may be considered as a first subsystem of the automatic flight control system illustrated. The flight control computer 20 is of dual channel configuration with cross channel monitoring. Thus the flight control computer 20 includes first and second data processing channels 21 and 22 respectively. The channel 21 includes an input data conversion portion 23, a processing element 24 and an output data conversion portion 25 configured and intercoupled in a manner similar to the channel 10 described above with respect to FIG. 1. The channel 22 similarly includes an input data converion portion 26 and an output data conversion portion 27 as well as processing elements 28 and 29. The components of the channel 22 are configured and intercoupled in a manner similar to that described above with respect to the channel 10 of FIG. 1 except that two processing elements are associated with the channel 22 instead of one processing element as illustrated in channel 10. The channel 22 also includes switches 30 and 31 coupling the processing elements 28 and 29, respectively, to the output data conversion portion 27. The switches 30 and 31 are arranged to disable the processing elements 28 and 29, respectively, from providing control signals from the channel 22.

The channels 21 and 22 are cross coupled in a cross channel monitoring arrangement via leads 32 and 33 and cross channel monitoring software within the processing elements 24, 28 and 29 to be further described hereinbelow. The lead 32 couples the output of the output data conversion portion 25 of the channel 21 with the input data conversion portion 26 of the channel 22. Similarly the lead 33 couples the output from the output data conversion portion 27 of the channel 22 with the input data conversation portion 23 of the channel 21. The processing element 24 contains a software segment for comparing the outputs of the channel 21 with the outputs of the channel 22 provided by the processing element 28 and provides a cross channel comparison discrete signal on a lead 34 when a discrepancy is detected. Similarly processing element 24 includes software for comparing the outputs of the channel 21 with the output of the channel 22 as provided by the processing element 29 providing a discrete signal on a lead 35 when a disagreement is discerned. The processing element 28 also includes cross channel monitoring software for comparing the outputs from the channel 21 with the outputs from the channel 22 as provided by the processing element 28 providing a discrete signal on the lead 36 when a discrepancy is detected. Similarly, the processing element 29 includes cross channel monitoring software comparing the outputs from the channels 21 and 22 with respect to the processing element 29 and providing a discrete signal on a lead 37 when a disagreement is discerned. It is appreciated that the leads 34–37 conveying the cross channel monitoring discretes are illustrated as dashed lines, whereas the solid lines eminating from the elements 24, 28 and 29 convey data.

The input data conversion portions 23 and 26 of the channels 21 and 22, respectively, receive sensor data from sensor sets 38. Sensors for providing signals related to aircraft and flight parameters are included within the block 38 in the manner described above with respect to the sensor set 11 of FIG. 1. The outputs from the output data conversion portions 25 and 27 of the channels 21 and 22, respectively, are applied to aircraft control servos and/or flight directer equipment 39. The aircraft control servos and/or flight directer equipment 39 areof the type described above with respect to the block 15 of FIG. 1.

The cross channel comparison discrete signals on the leads 35 and 37 are applied as inputs to an OR element 40, the output of which is applied to actuate the switch 31. Thus, whenever the output from the channel 21 disagrees with the output from the channel 22 provided by the processing element 29, the fault as detected by either the processing element 24 or the processing element 29, or by both, result in discrete signals on one or both of the lines 35 and 37 enabling the OR element 40 which opens the switch 31. Therefore, this discrepancy results in disabling the processing element 29 from further contributing to the output of the channel 22 thereby disabling the processing element 29 from further effecting external control.

In a similar manner an OR element 41 receives the cross channel monitoring discrete signals on the leads 34 and 36 with respect to the cross channel comparison involving processing element 28, thereby opening the switch 30 when a cross channel monitoring discrete is provided on either the lead 34 or the lead 36.

The outputs from OR elements 40 and 41 are also applied as inputs to an AND element 42. The output of the AND element 42 is applied to the aircraft control servos and/or flight director equipment 39 for disabling the servos and equipment 39 whenever both the OR elements 40 and 41 are enabled. Thus, when outputs from the channel 22 due to both of the processing elements 28 and 29 disagree with the outputs from the channel 21, the servos and equipment 39 are disabled. The servos and equipment 39 may be disabled by the output from the AND element 42 by, for example, disconnecting the power to the servos. Conveniently, power to the servo engage coils or detents may be disconnected.

As discussed above, the automatic flight control system illustrated in FIG. 2 includes a first subsystem comprising the flight control computer 20. The automatic flight control system also includes an independent subsystem comprising a flight control computer 50. The architecture of the flight control computer 50 is also dual channel comprising channels 51 and 52. The arrangement and construction of the elements, except for the processing elements, of the flight control computer 50 are substantially the same as that described above with respect to the flight control computer 20. The elements 50 through 67 and 70 through 72 of the flight control computer 50 correspond, respectively, to the elements 20 through 37 and 40 through 42 of the flight control computer 20. The servos and equipment 69 in the second subsystem replicate the servos and equipment 39 of the first subsystem. The input data conversion portions 53 and 56 of the respective channels 51 and 52 receive sensor data from the sensor set 38 in a manner to be explained.

As discussed above, it is approaching impossibility to prove the absence of faults to the stringent levels required by Federal Air Relations in digital processing elements with respect to the hardware and software thereof. This is particularly true with respect to critical functions. Additionally, as discussed above, identical redundant channels with cross channel monitoring is ineffective in detecting generic faults. Accordingly, in accordance with the present invention, fail operational performance to the levels required by the Federal Air Regulations is for the first time attained in the presence of generic faults which may effect processor hardware and software without uitilizing the traditional, exhaustive verification and validation procedures with respect to the processing elements. In order to achieve this objective, three dissimilar types of data processing are utilized with respect to the processing elements 24, 28, 29, 54, 58 and 59 of the automatic flight control system illustrated in FIG. 2. These dissimilar data processing types are conveniently designated as A, B and C.

In accordance with the invention, it is necessary that the processing elements 24, 28 and 29 of the flight control computer 20 provide dissimilar data processing with respect to each other and similarly the processing elements 54, 58 and 59 of the flight control computer 50 also provide dissimilar data processing with respect to each other. It is also necessary in accordance with the invention that the processing elements in the channels that only have one processing element associated therewith; viz, the elements 24, and 54, provide dissimilar data processing with respect to each other.

Accordingly, in the embodiment of FIG. 2, the processing elements 24, 28 and 29 of the flight control computer 20 provide data processing of the C, A and B types respectively. The processing elements 54, 58 and 59 of the flight control computer 50 provide data processing of the B, A and C types respectively. Thus it is appreciated that the data processing type of any of the processing elements in the system is selected from a group consisting of three dissimilar types. Therefore, it is seen that processing elements 24, 28 and 29 provide dissimilar data processing with respect to each other as do the processing elements 54, 58 and 59. Furthermore, the processing elements 24 and 54 provide dissimilar data processing with respect to each other.

The dissimilar data processing may be effected by dissimilar hardware, dissimilar software or both dissimilar hardware and dissimilar software. If only generic faults associated with the software are of concern, then the hardware of the processing elements may be identical.

Dissimilar hardware may be effected by utilizing three processing elements of different electrical and logic design which additionally may be manufactured by different manufacturers. The software may be rendered dissimilar by utilizing three distinct teams of program designers providing three distinct program specifications and three separate teams of programmers writing dissimilar code in dissimilar languages. The assemblers and compilers utilized for each type of data processing may also be dissimilar with respect to each other as may the software operating systems and executive code for each type of data processing. The software support procedures such as software testing may also be rendered dissimilar by utilizing dissimilar procedures and personnel. The tasks, however, that each processing element performs are similar with respect to each other. The automatic flight control system specification including aircraft control laws and mode transition criteria are common to all three data processing type elements.

In a preferred embodiment of the invention, three dissimilar computer types are utilized which are manufactured and are available from the assignee of the present invention. These computers are the SDP 175-2, the SDP 275 and the SDP 375. These computers are designed by the assignee of the present invention for airborne applications. The SDP 175-2 microprocessor was designed and developed by the present assignee. The SDP 275 is based on the Z8002 microprocessor. The SDP 375 is based on the 8086-8087 Intel microprocessor design. Each of these three computer types has its own distinct assembler. It is appreciated that although three specific computer types are delineated above, any three types of processing elements that provide dissimilar data processing with respect to each other may be utilized in practicing the invention.

Figure 3A:
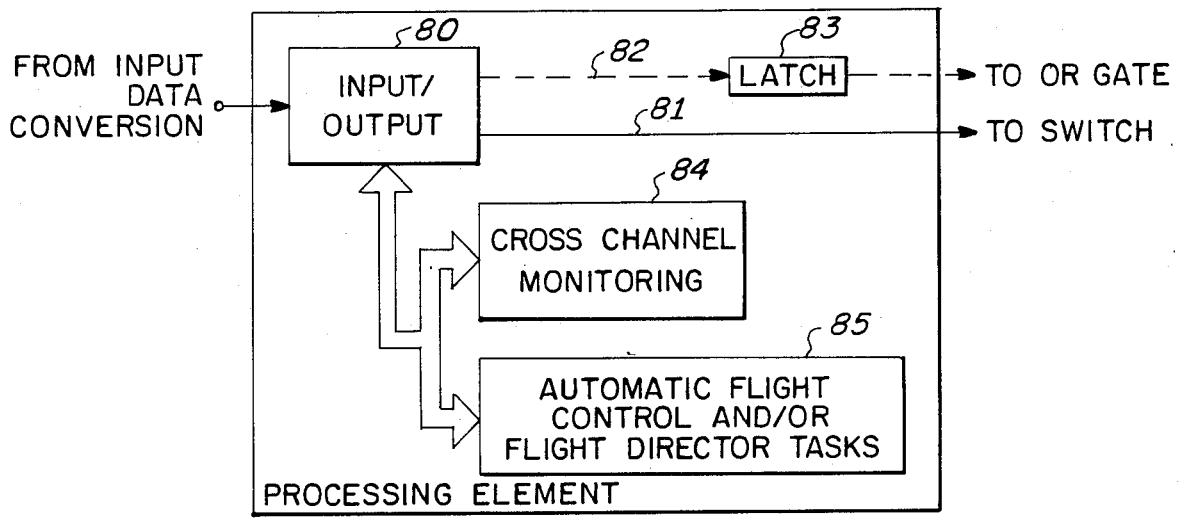
FIGS. 3A and 3B are block diagrams illustrating details of the processing elements of FIG. 2.
Figure 3B:
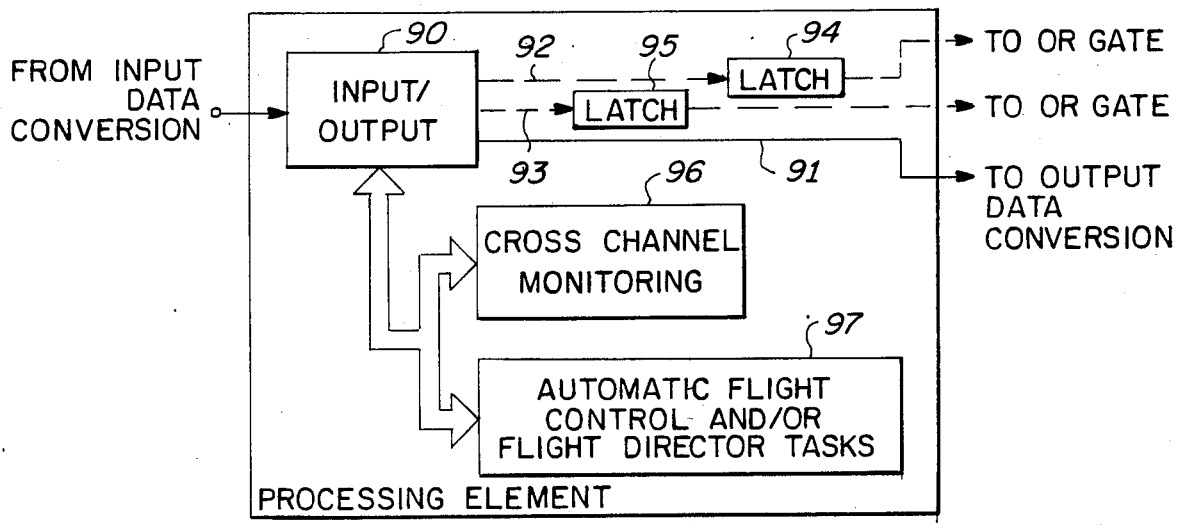

Referring now to FIGS. 3A and 3B, further details of the processing elements utilized in the automatic flight control system of FIG. 2 are illustrated. FIG. 3A illustrates the processing elements 28, 29, 58 and 59 of FIG. 2 while FIG. 3B illustrates the processing elements 24 and 54 of FIG. 2. Referring now to FIG. 3A, an input-output section 80 of the processing element receives input from the associated input data conversion block of FIG. 2 and provides data outputs on a lead 81 to the switch associated with the processing element. The input-output section 80 also provides a discrete signal on a lead 82 via a latch 83 to the associated OR gate of FIG. 2. The discrete signal on the lead 82 is provided as a result of cross channel comparison monitoring in a manner to be explained.

The processing element of FIG. 3A includes a cross channel comparison monitoring capability illustrated schematically at reference numeral 84. The cross channel monitoring 84 compares the output from the other channel of the flight control computer in which the processing element of FIG. 3A is located with the output of the channel in which it itself is located and sets into the latch 83 a discrete whenever the cross channel monitoring 84 detects disagreement between the two channels.

The processing element of FIG. 3A also includes the capability of performing the numerous automatic flight control and/or flight director tasks required of the automatic flight control system of FIG. 2. This task performance capability is schematically illustrated at reference numeral 85. The results of performing the tasks 85 are communicated via the input/output 80 to the switch associated with the processing element and then to the output data conversion portion of the channel in which the processing element is located.

Referring to FIG. 3B, further details of the processing elements 24 and 54 of FIG. 2 are illustrated. The processing element of FIG. 3B includes an input/output section 90 for receiving data from the input data conversion portion of the channel of FIG. 2 in which the processing element is utilized and for providing data via a lead 91 to the output data conversion portion of FIG. 2 of FIG. 2 associated with the processing element. The input/output section 90 also provides cross channel monitoring discretes on leads 92 and 93 which are set into latches 94 and 95, respectively. The outputs from the latches 94 and 95 are coupled respectively to the two OR gates included in the flight control computer in which the processing element is located as illustrated in FIG. 2.

The processing element of FIG. 3B includes a cross channel monitoring capability illustrated schematically at reference numeral 96. The cross channel monitoring 96 of the processing element of FIG. 3B, compares the output provided by the channel in which the processing element of FIG. 3B is located with the outputs from the other channel of the flight control computer provided by the two respective processing elements associated with the other channel. When a disagreement occurs between the output of the channel that includes the processing element of FIG. 3B and the output of the other channel due to one of the two processing elements associated therewith, a cross channel monitoring discrete is set into the latch 94. If the disagreement is due to the output of the other processing element associated with the other channel of the flight control computer, the cross channel monitoring discrete is set into the latch 95.

The processing element of FIG. 3B includes the capability of performing automatic flight control and/or flight director tasks indicated schematically at reference numeral 97. These tasks are identical to those discussed above with respect to reference numeral 85 of FIG. 3A.

Referring to FIGS. 2, 3A and 3B it is appreciated from the foregoing that because of the architecture described above, fail operational performance is attained in the automatic flight control system of FIG. 2 in the presence of generic faults. This performance is attained without the exhaustive analysis otherwise required in prior art arrangements to attempt to prove the absence of hardware and software generic faults in the processing elements of the system. The flight control computer 20 with the servos and equipment 39 provide complete control of the aircraft in all three axes. Similarly, the flight control computer 50 with its dedicated set 69 of servos and equipment also provides independent control of the aircraft in the three axes. The channels 21 and 22 of the flight control computer 20 provide cross channel comparison monitoring to detect any discrepancies between the two channels. In a similar manner, the cross channel comparison monitoring in the flight control computer 50 compares the outputs of the channels 51 and 52 to detect discrepancies therebetween. Each of the processing elements in each of the flight control computers performs the full set of three axis critical tasks required in the control of the aircraft. It is appreciated that not all of the processing element outputs need be utilized to drive the aircraft control servos and flight director equipment. For example, the channel 21 of the flight control computer 20 may be utilized to provide aircraft control with respect to the longitudinal axis of the aircraft via the servos and equipment 39 and the channel 22 may provide the lateral axis aircraft control via the servos and equipment 39. In a similar manner, the channel 51 of the flight control computer 50 may provide longitudinal axis control via the servos and equipment 69 and the channel 52 lateral axis control via the servos and equipment 62.

It is appreciated, therefore, that the various leads illustrated in FIG. 2 may be multi-conductor buses conveying pluralities of signals. For example, the leads 32 and 33 are multi-conductor buses intercoupling all of the outputs of the output data conversion sections of the channels to the input data conversion sections of the opposite channels so that the cross channel monitoring functions may be performed within the processing elements. Some of these conductors of these buses also go to the servos and equipment 39 as described above to provide control of the aircraft in all of its axes. Similarly, the leads illustrated with respect to the flight control computer 50 may be multi-conductor buses interconnecting the elements illustrated therein and the servos and equipment 69. In a similar manner, the leads 81 and 91 of the processing elements illustrated in FIGS. 3A and 3B are also multi-conductor buses conveying pluralities of data signals.

If a generic fault is present in the A type of processing element (processing elements 28 and 58) the cross channel monitoring in the flight control computer 20 will detect a disagreement between the channels 21 and 22 and the cross channel monitoring of the flight control computer 50 will detect a disagreement between the channels 51 and 52. Specifically, with respect to the flight control computer 20 the cross channel monitoring 84 (FIG. 3A) of the processing element 28 will provide a cross channel comparison disagreement signal to the latch 83 (FIG. 3A) and thus via the lead 36 to the OR gate 41. Redundantly the cross channel monitoring 96 (FIG. 3B) of the processing element 24 will set a cross channel monitoring disagreement signal into the latch 94 (FIG. 3B) and thus apply this disagreement discrete via the lead 34 to the OR gate 41. Either one of these discretes applied to the OR gate 41 would result in deactuating the switch 30 thereby preventing the faulted processing element 28 from providing further outputs to the channel 22. In effect, the processing element 28 is disabled from further control of the aircraft. The B type processing element 29 in the channel 22, however, continues to provide active outputs for the channel.

In a similar manner, the faulted A type processing element 58 of the flight control computer 50 is disabled via the cross channel monitoring discretes 64 and 66 through the OR gate 71 deactuating the switch 60. The channel 52 of the flight control computer 50 also retains full processing capability via the C type processing element 59.

It will be appreciated that after the first generic fault manifests itself in the A type processing element, the automatic flight control system illustrated in FIG. 2 remains fully operational with full cross channel monitoring in each flight control computer. After this failure of the type A processing element, the system retains a dual-dual configuration. That is, the flight control computer 20 retains fully operational channels 21 and 22 with cross channel monitoring and the flight control computer 50 retains channels 51 and 52 with cross channel monitoring. Thus the system of FIG. 2 is fail operational after a first generic failure of the A type processing element. It is appreciated that the cross channel monitoring discretes that were enabled because of this failure remains stored in the latches 83 and 94 (FIGS. 3B and 3B) of the processing elements 24, 28, 54 and 58 thus maintaining the OR gates 41 and 71 enabled.

After the first failure in the A type processing element, channels 22 and 21 of the flight control computer 20 have B and C type processing elements, respectively, associated therewith and the channels 51 and 52 of the flight control computer 50 also have B and C type processing elements associated therewith, respectively.

The next generic fault that is manifested in either the B type processing elements or the C type processing elements will result in a cross channel miscomparison in both flight control computers 20 and 50 resulting in a passive shutdown of the entire system. The second generic failure will result in enablement of the OR gates 40 and 70 thereby enabling the AND gates 42 and 72 thereby disabling the servos and equipment 39 and 69 from providing further control of the aircraft.

If, however, the first generic fault to be manifested occurs in the B type processing elements 29 and 54, the automatic flight control system of FIG. 2 again fails operatively but retains a different configuration from that described above. In the flight control computer 20, the failure of the B type processing element 29 results in enablement of the OR gate 40 and the disablement of the switch 31 thereby preventing the processing element 29 from providing further outputs for the channel 22. After the failure, however, the flight control computer 20 retains two fully operative channels with operative cross channel comparison monitoring. The channel 21 retains the C type processing element 24 and the channel 22 retains the A type processing element 28. The failure discretes resulting from the cross channel monitoring that detected the failure is latched into the processing elements 24 and 29 to maintain enabling signals on the leads 37 and 35 thereby maintaining the OR gate 40 enabled.

In the flight control computer 50, however, the failure of the type B processing element 54 results in a miscomparison between the outputs of both the A type processing element 58 and the C type processing element 59 of the opposite channel. This results in cross channel discretes on all of the leads 64, 65, 66 and 67 enabling both OR gates 70 and 71 and therefore the AND gate 72. Enablement of the AND gate 72 disables the servos and equipment 69 thereby shutting down the subsystem of the automatic flight control system comprising flight control computer 50 and the servos and equipment 69. The automatic flight control system, however, remains operational because of the operative and fully monitored state of the subsystem comprising the flight control computer 20 and the servos and equipment 39. The next generic failure in either the C type processing element 24 or the A type processing element 28 will be detected by the cross channel monitoring between the channels 21 and 22 resulting in passive disablement of the subsystem comprising the flight control computer 20 and the servos and equipment 39.

A first generic failure in the C type processing elements 24 and 59 results in the failure configuration just described except that after this first failure, the subsystem comprising the flight control computer 50 and the servos and equipment 69 remains operational whereas the subsystem comprising the flight control computer 20 and the servos and equipment 39 is passively disabled. The failed configuration retains the channel 51 with the B type processing element 54 and the channel 52 with the A type processing element 58. The channels 51 and 52 again retain complete cross channel monitoring capabilities. A second generic failure in either the A type processing element 58 or the B type processing element 54 results in passive disablement of the subsystem comprising the flight control computer 50 and the servos and equipment 69 in a manner similar to that described above.

Generally, with respect to the automatic flight control system of FIG. 2, two independent subsystems are utilized, one comprising the flight control computer 20 with the servos and equipment 39 and the other comprising the flight control computer 50 with the servos and equipment 69. The cross channel comparison monitoring in each subsystem is such that if only one of the processing elements in the channel having two processing elements disagrees with the channel having one processing element, the involved processing element in the two processing element channel is disabled from further control of the aircraft. If, however, both processing elements in the channel having two processing elements disagree with the channel having the single processing element, the entire subsystem is disabled. The described architecture may also be considered as having a channel with a primary processing element and an active standby processing element that is substituted for the primary processing element if a generic failure should occur with respect to the primary processing element. If replacement does not resolve the disagreement, the subsystem is then disabled. For example, in the flight control computer 20, the channel 22 may be considered as having a primary processing element 28 and a standby processing element 29. With appropriate logic actuating the switches 30 and 31, the processing element 29 may be substituted for the processing element 28 upon detecting a disagreement between the processing element 28 and the processing element 24. If this substitution does not resolve the disagreement between the channels 21 and 22, the servos and equipment 39 would be disabled as previously described.

Thus, it is appreciated with respect to the architecture of the automatic flight control system of FIG. 2 that when a generic failure occurs in one of the two processing elements in the channel having the two elements, that the failed element is disabled from effecting further external aircraft control. When, however, the generic failure occurs in the processing element that does not have a second processing element in the channel therewith, the entire subsystem is disabled.

As discussed above, the automatic flight control system of FIG. 2 is fail operational in response to a first generic fault and fail passive in response to a second generic fault. The sensor sets 38 and the servos and equipment 39 and 69 in combination with the flight control computers 20 and 50 must also exhibit these characteristics. Thus in a well-known manner, the sensor sets 38 may include redundancy, monitoring and voting to achieve the characteristics. For a fail operational characteristic, three sensor sets are traditionally utilized, particularly with respect to those sensors providing data for the critical modes of the flight regimes. If a fault occurs in one set, the two remaining sets may be utilized to provide the data and for cross sensor comparison. When the two remaining sets fail to agree, the entire system is shut down. In a similar manner the servos and equipment are utilized so as to provide the failure characteristics discussed above. Preferably, each of the blocks 39 and 69 represent a full set of control servos and/or flight director equipment for providing all of the aircraft control and flight director functions for the aircraft. The flight control computers 20 and 50 are utilized to monitor the performance of the servos and equipment 39 and 69 respectively. Servo position and rate transducers coupled to control surface actuators are included in the blocks 39 and 69 and provide inputs (not shown) to the sensor sets 38 for end around inputting into the flight control computers 20 and 50. In this manner, by means of conventional modeling techniques, the flight control computers 20 and 50 can monitor the performance of the servos and equipment 39 and 69, respectively, disabling either set of servos and equipment if a failure is detected. Thus, in response to a detected failure in either the servos and equipment 39 or 69, the involved subsystem of the automatic flight control system of FIG. 2 is disabled. This leaves operational the remaining subsystem with its servos and equipment to maintain control of the aircraft until a second failure in that subsystem causes a shutdown of the entire automatic flight control system.

Thus the inputs and outputs of each of the blocks 39 and 69 are monitored and compared by the associated flight control computer to detect failures as described. The flight control computers 20 and 50 provide inputs to the associated servos and equipment, monitor the outputs from the associated servos and equipment and enable and disable the servos and equipment for providing the desired failure characteristics.

Alternatively, each of the servos and equipment blocks 39 and 69 may comprise multiply redundant sets for achieving the desired failure characteristic. For example, three redundant sets of servos and equipment would provide fail operational performance. Such redundant servos may utilize conventional force summing and cam-out techniques to remain operational in response to a failure.

It is appreciated that it is only necessary to utilize dissimilar redundancy, in the manner described above, with respect to the processing elements of the automatic flight control system of FIG. 2. All of the input data conversion portions may be implemented identically as may all of the output data conversion portions. These sections of the automatic flight control system of FIG. 2 may be designed and analyzed by traditional procedures so as to prove compliance with the federal air regulations descussed above. The invention, however, provides substantial savings in the time and expense otherwise associated with the level of exhaustive analysis traditionally required with respect to digital computer processing elements in applications requiring performance to a high confidence level. With respect to the logic comprising the gates 40, 41, 42, 70, 71 and 72 and the switches 30, 31, 60 and 61, it will be appreciated that conventional techniques such as redundancy and analysis may be utilized to assure that these components are consistent with the failure characteristics discussed above.

An additional advantage derived from utilizing the present invention relates to software or hardware changes introduced after certification of the flight control system by the Federal Aviation Authority. The possibility that such changes to software or hardware would result in an undetected error is essentially elimenated. Such errors could occur in coding, or in complex integrated circuits such as microprocessors.

The cross channel monitoring performed with respect to the automatic flight control system of FIG. 2 was explained above in terms of the elements 32, 33, 62 and 63 of FIG. 2 and the elements 84 and 96 of FIGS. 3A and 3B, respectively. It is appreciated that other types of cross channel comparisons may be utilized in practicing the invention. For example, dedicated digital comparison logic could be utilized to the same effect. Analog circuitry could also be used for the cross channel comparitors. With respect to the flight control computer 20 of FIG. 2, a hardware comparitor may be utilized for comparing the outputs of the processing elements 24 and 29 and operating the switch 31 when a disagreement is detected. Another comparitor may be utilized between the processing elements 24 and 28 for actuating the switch 30. When both comparitors detect disagreement, the servos and equipment 39 may be disabled. A similar arrangement could be included in the flight control computer 50. It is appreciated that the dual-dual channel configuration for automatic flight control systems provides fail operational performance for random failures. The dual-dual configuration of the automatic flight control system of FIG. 2 utilizing the invention provides the same fail operational response to a generic failure. In both situations, only one of the dual channel subsystems is disabled in response to the first failure.

As discussed above, all of the processing elements included in the flight control computers of FIG. 2 perform the same tasks utilizing dissimilar data processing. If the cross channel monitoring with respect to the two processing elements in one of the channels of each flight control computer indicates agreement with the processing element of the other channel of the flight control computer, then the output can be taken from either channel for application to the aircraft control servos and/or flight director equipment. Additionally where the cross channel monitoring indicates agreement, the output from the channel having two processing elements may be derived from either of the two elements. In the presently preferred mode of practicing the invention, the redundancy and cross channel monitoring configuration described above is only utilized for critical functions. A noncritical function may be provided by only one channel of each flight control computer without utilizing cross channel monitoring. For such noncritical mode implimentations, traditional verification and validation procedures may be utilized.

Figure 4:
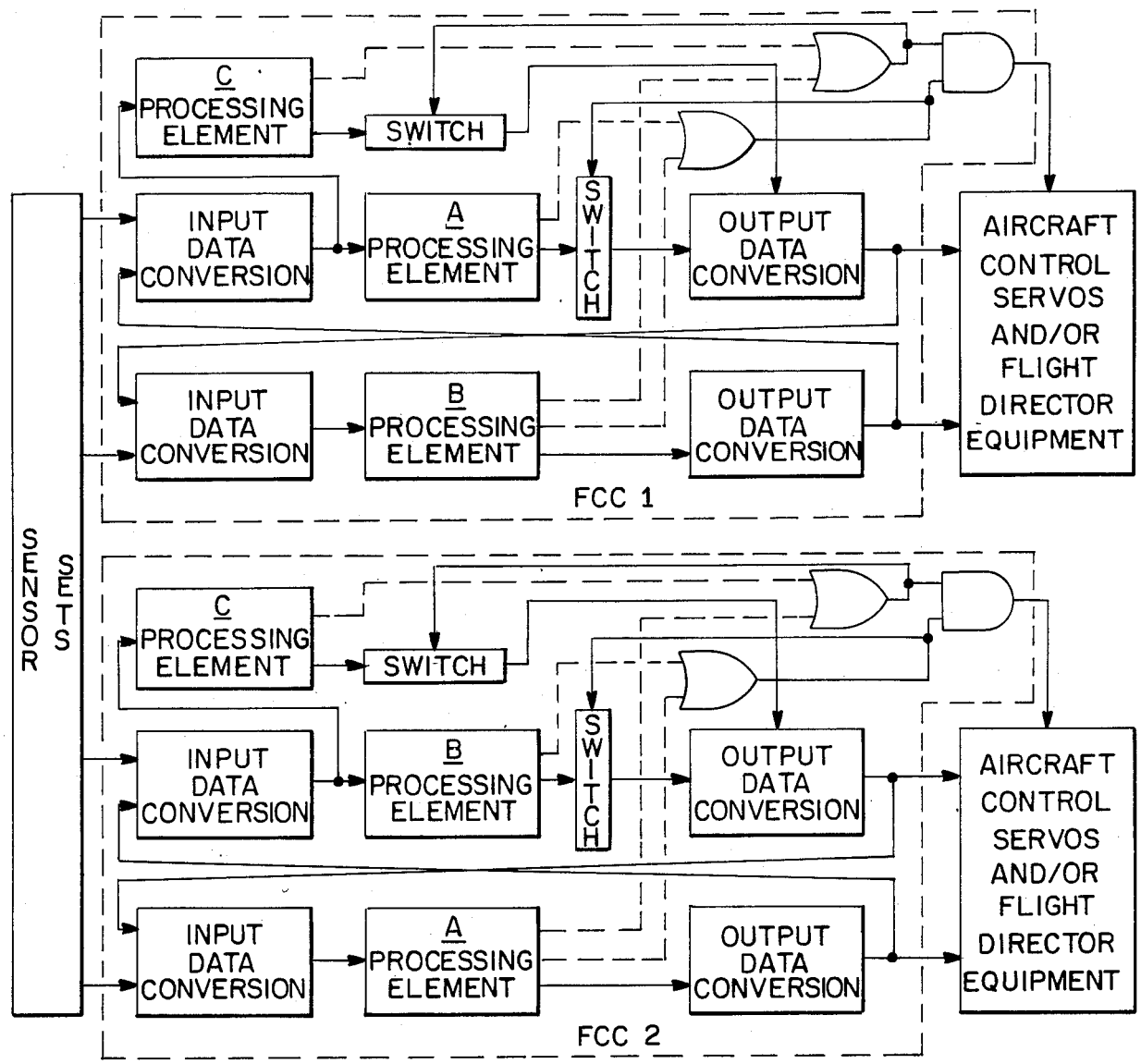
FIG. 4 is a block diagram of an alternative embodiment of an automatic flight control system implemented in accordance with the present invention.

As discussed above with respect to FIG. 2 the A-type processing elements 28 and 58 in the channels 22 and 52 of the flight control computers 20 and 50, respectively, may be considered as the primary processors for the channels with the B-type and C-type processing elements 29 and 59 considered as secondary active standby processors. It is appreciated that an alternative but equivalent configuration may be provided utilizing dissimilar processing element types for the primary processors with the same type of processing element utilized as the secondary element in the channel. Such an arrangement is illustrated in FIG. 4. It will be appreciated that the embodiment of FIG. 4 is identical to that of FIG. 2 except for the arrangement of the A, B and C-type processing elements with respect to the channels. Further discussion, therefore, of the details of the FIG. 4 embodiment will be omitted for brevity. The failure modes of the FIG. 4 embodiment are similar to that described above with respect to FIG. 2. The automatic flight control system of FIG. 4 is fail operational with respect to the first generic fault and fail passive with respect to the second generic fault. In the embodiment of FIG. 4, the subsystem including flight control computer 2 will be disabled in response to a first generic failure in the A-type processing element with the subsystem including flight control computer 1 providing continued fail passive performance. If the first generic failure occurs in the B-type processing element, the subsystem including flight control computer 1 is disabled with the subsystem including flight control computer 2 continuing operation. Should the first generic failure occur in the C-type processing element, both subsystems will remain operational in a fail passive status.

It will be appreciated that a third arrangement (not shown) equivalent to the embodiments of FIGS. 2 and 4 may be effected where the processing elements equivalent to the elements 28 and 58 of FIG. 2 are of dissimilar data processing types and in addition the processing elements equivalent to the elements 29 and 59 are also of dissimilar data processing types. The failure modes for this configuration are similar to those described above with respect to FIGS. 2 and 4.

Figure 5:
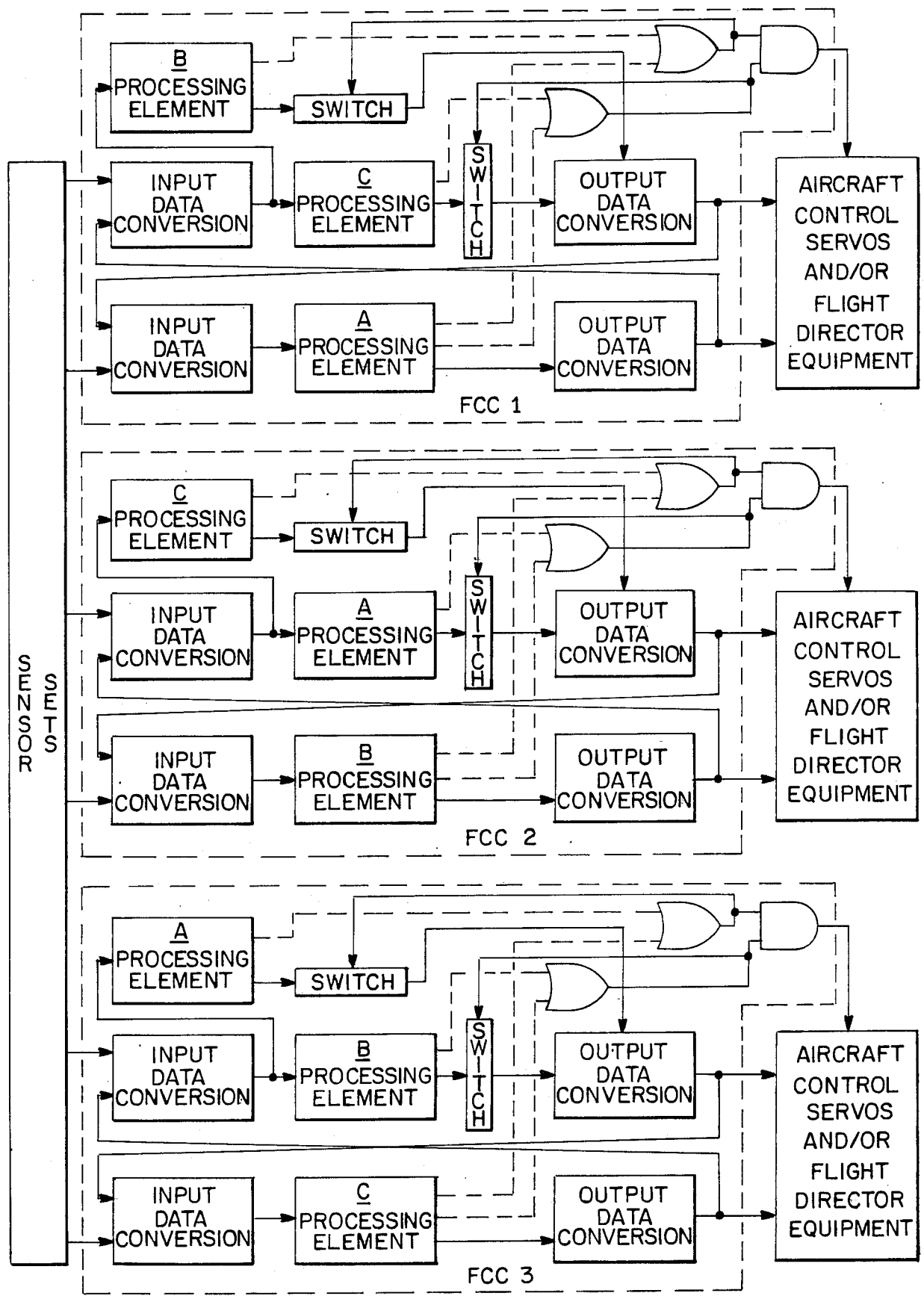
FIG. 5 is a block diagram of a further embodiment of an automatic flight control system implemented in accordance with the present invention.

Referring to FIG. 5, an automatic flight control system is illustrated that is fail operational for a first generic fault and fail passive for a second generic fault, but is fail operational squared with respect to random faults. The system of FIG. 5 will remain operational after two consecutive random failures and will be fail passive with respect to a third random failure. The automatic flight control system of FIG. 5 utilizes three subsystems, each having a flight control computer (FCC) and dedicated aircraft control servos and/or flight director equipment in a manner similar to that described above with respect to FIG. 2. In the three flight control computers of the system of FIG. 5, the processing elements in each FCC provide dissimilar data processing with respect to each other. Thus a generic failure in any of the processing element types would result in a fail passive disablement of one of the subsystems. The system then degrades to a fail passive status for the next generic failure, but retains a fail operational status with respect to a second random failure.

It will be appeciated that the sensor sets of FIG. 5 should be configured, in a conventional manner, to provide the fail operational squared characteristic of the architecture of the system illustrated. In a well known manner, four sensor sets for the critical data provides the desired characteristics.

The above described embodiments of the invention were explained in terms of the elements 30, 31, 34–37, 40–42, 60, 61, 64–67 and 70–72 (FIG. 2) for disabling processing elements and subsystems in response to detected failures. The specific signals, switches and logic were illustrated by way of example with other equivalent disabling arrangements being usable in practicing the invention. For example, the two switches 30 and 31 of the channel 22 may be replaced by a single switch that couples the output of either processing element 28 or processing element 29 to the output data conversion block 27. Suitable logic contained, for example, within the processing element 24, may provide a signal that controls the switch to select either the processing element 28 or the processing element 29 depending upon the cross channel comparisons. A second signal may be provided by the processing element 24 for disabling the servos and equipment 39 in the event both of the processing elements 28 and 29 disagree with the processing element 24. Suitable comparison outputs from the processing elements 28 and 29 may also control the switch and disable the servos and equipment 39 in a similar manner. Additionally, the arrangement may also be used in implementing the other subsystem of FIG. 2 as well as the subsystems of FIGS. 4 and 5.

Although the present invention was explained in terms of an automatic flight control system, the inventive concept is also applicable in other environments such as nuclear control systems and railroad switching systems.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An automatic flight control system for aircraft having sensor means for providing sensor signals in accordance with flight conditions experienced by said aircraft and having aircraft control means responsive to control signals for controlling the flight conditions of said aircraft, said system comprising
   at least first and second automatic flight control subsystems,
   said first subsystem including first and second automatic flight control system channels and said second subsystem including third and fourth automatic flight control system channels,
   said first, second, third and fourth automatic flight control system channels receiving said sensor signals and providing said control signals,
   a first digital data processing computer included in said first channel,
   second and third digital data processing computers included in said second channel,
   first cross channel monitoring means for comparing the output of said first computer with the outputs of said second and third computers and providing first and second comparison signals in accordance with disagreement therebetween, respectively,
   first disabling means responsive to said first comparison signal for disabling said second computer when said first comparison signal indicates disagreement between the outputs of said first and second computers,
   second disabling means responsive to said second comparison signal for disabling said third computer when said second comparison signal indicates disagreement between the outputs of said first and third computers,
   third disabling means responsive to said first and second comparison signals for disabling said first automatic flight control subsystem when said first and second comparison signals indicate disagreement between the outputs of said first and second computers and between the outputs of said first and third computers, respectively,
   a fourth digital data processing computer included in said third channel,
   fifth and sixth digital data processing computers included in said fourth channel,
   second cross channel monitoring means for comparing the output of said fourth computer with the outputs of said fifth and sixth computers and providing third and fourth comparison signals in accordance with disagreement therebetween, respectively,
   fourth disabling means responsive to said third comparison signal for disabling said fifth computer when said third comparison signal indicates disagreement between the outputs of said fourth and fifth computers,
   fifth disabling means responsive to said fourth comparison signal for disabling said sixth computer when said fourth comparison signal indicates disagreement between the outputs of said fourth and sixth computers, and
   sixth disabling means responsive to said third and fourth comparison signals for disabling said second automatic flight control subsystem when said third and fourth comparison signals indicate disagreement between the outputs of said fourth and fifth computers and the outputs of said fourth and sixth computers, respectively,
   said first, second, third, fourth, fifth and sixth computers performing identical tasks with respect to each other for providing said control signals in response to said sensor signals,
   said first, second and third computers providing dissimilar data processing with respect to each other,
   said fourth, fifth and sixth computers providing dissimilar data processing with respect to each other,
   said first and fourth computers providing dissimilar data processing with respect to each other,
   each of said first, second, third, fourth, fifth and sixth computers being selected from a group consisting of three computers that provide dissimilar data processing with respect to each other,
   whereby said automatic flight control system is fail-operational with respect to a first generic fault.

2. The system of claim 1 in which said group consists of three computers that are dissimilar in hardware with respect to each other.

3. The system of claim 1 in which said group consists of three computers that are dissimilar in software with respect to each other.

4. The system of claim 1 in which said group consists of three computers that are dissimilar in hardware and in software with respect to each other.

5. The system of claim 1 in which said channels include respective input data conversion portions responsive to said sensor signals for converting said sensor signals into a format suitable for inputting into said computers in said channels.

6. The system of claim 1 in which said channels include respective output data conversion portions for converting the outputs provided by said computers in said channels into a format suitable for said control signals for application to said aircraft control means.

7. The system of claim 1 in which said second computer includes cross channel monitoring means for comparing the output of said first computer with the output of said second computer, and latch means for storing a discrete signal in accordance with said comparison, said latch means providing said first comparison signal.

8. The system of claim 1 in which said third computer includes cross channel monitoring means for comparing the output of said first computer with the output of said third computer, and latch means for storing a discrete signal in accordance with said comparison, said latch means providing said second comparison signal.

9. The system of claim 1 in which said fifth computer includes cross channel monitoring means for comparing the output of said fourth computer with the output of said fifth computer, and latch means for storing a discrete signal in accordance with said comparison, said latch means providing said third comparison signal.

10. The system of claim 1 in which said sixth computer includes cross channel monitoring means for comparing the output of said fourth computer with the output of said sixth computer, and latch means for storing a discrete signal in accordance with said comparison, said latch means providing said fourth comparison signal.

11. The system of claim 1 further comprising a third automatic flight control subsystem, said third subsystem including fifth and sixth automatic flight control system channels, said fifth and sixth automatic flight control system channels receiving said sensor signals and providing said control signals, a seventh digital data processing computer included in said fifth channel, eighth and ninth digital data processing computers included in said sixth channel, third cross channel monitoring means for comparing the output of said seventh computer with the outputs of said eighth and ninth computers and providing fifth and sixth comparison signals in accordance with disagreement therebetween, respectively, seventh disabling means responsive to said fifth comparison signal for disabling said eighth computer when said fifth comparison signal indicates disagreement between the outputs of said seventh and eighth computers, eighth disabling means responsive to said sixth comparison signal for disabling said ninth computer when said sixth comparison signal indicates disagreement between the outputs of said seventh and ninth computers, and ninth disabling means responsive to said fifth and sixth comparison signals for disabling said third automatic flight control subsystem when said fifth and sixth comparison signals indicate disagreement betwen the outputs of said seventh and eighth computers and the outputs of said seventh and ninth computers, respectively, said first, second, third, fourth, fifth, sixth, seventh, eighth and ninth computers performing identical tasks with respect to each other for providing said control signals in response to said sensor signals, said seventh, eighth and ninth computers providing dissimilar data processing with respect to each other, said first, fourth and seventh computers providing dissimilar data processing with respect to each other, each of said first, second, third, fourth, fifth, sixth, seventh, eighth and ninth computers being selected from said group consisting of three computers that provide dissimilar data processing with respect to each other, whereby said automatic flight control system is fail operational with respect to a first generic fault and is fail operational with respect to first and second random faults.

12. The system of claim 1 in which said first computer includes cross channel monitoring means for comparing the output of said first computer with the outputs of said second and third computers, and first and second latch means for storing discrete signals in accordance with said comparisons, respectively, said first and second latch means providing said first and second comparison signals respectively.

13. The system of claim 12 in which said second computer includes cross channel monitoring means for comparing the output of said first computer with the output of said second computer, and third latch means for storing a discrete signal in accordance with said comparison, said third latch means providing said first comparison signal.

14. The system of claim 13 in which said third computer includes cross channel monitoring means for comparing the output of said first computer with the output of said third computer, and fourth latch means for storing a discrete signal in accordance with said comparison, said fourth latch means providing said second comparison signal.

15. The system of claim 14 in which said first disabling means comprises first switch means for transmitting the outputs of said second computer, and first OR gate means coupled to receive the outputs of said first and third latches for disabling said first switch means from transmitting the outputs of said second computer when either said first or third latch means provides a discrete signal representative of disagreement.

16. The system of claim 15 in which said second disabling means comprises second switch means for transmitting the outputs of said third computer, and second OR gate means coupled to receive the outputs of said second and fourth latch means for disabling said second switch means from transmitting the outputs of said third computer when either said second or fourth latch means provides a discrete signal representative of disagreement.

17. The system of claim 16 in which said third disabling means includes AND gate means coupled to receive the outputs of said first and second OR gate means for disabling said first automatic flight control subsystem when said first and second OR gate means both provide disabling signals.

18. The system of claim 1 in which said fourth computer includes
cross channel monitoring means for comparing the output of said fourth computer with the outputs of said fifth and sixth computers, and
first and second latch means for storing discrete signals in accordance with said comparisons respectively, said first and second latch means providing said third and fourth comparison signals respectively.

19. The system of claim 18 in which said fifth computer includes
cross channel monitoring means for comparing the output of said fourth computer with the output of said fifth computer, and
third latch means for storing a discrete signal in accordance with said comparison, said third latch means providing said third comparison signal.

20. The system of claim 19 in which said sixth computer includes
cross channel monitoring means for comparing the output of said fourth computer with the output of said sixth computer, and
fourth latch means for storing a discrete signal in accordance with said comparison, said fourth latch means providing said fourth comparison signal.

21. The system of claim 20 in which said fourth disabling means comprises
first switch means for transmitting the outputs of said fifth computer, and
first OR gate means coupled to receive the outputs of said first and third latch means for disabling said first switch means from transmitting the outputs of said fifth computer when either said first or third latch means provides a discrete signal representative of disagreement.

22. The system of claim 21 in which said fifth disabling means comprises
second switch means for transmitting the outputs of said sixth computer, and
second OR gate means coupled to receive the outputs of said second and fourth latch means for disabling said second switch means for transmitting the outputs of said sixth computer when either said second or fourth latch means provides a discrete signal representative of disagreement.

23. The system of claim 22 in which said sixth disabling means includes AND gate means coupled to receive the outputs of said first and second OR gate means for disabling said second automatic flight control subsystem when said first and second OR gate means both provide disabling signals.

24. An automatic flight control system for aircraft having sensor means for providing sensor signals in accordance with flight conditions experienced by said aircraft and having aircraft control means responsive to control signals for controling the flight conditions of said aircraft, said system comprising
at least first and second automatic flight control subsystems,
said first subsystem including first and second automatic flight control system channels and said second subsystem including third and fourth automatic flight control system channels,
said first, second, third and fourth automatic flight control system channels receiving said sensor signals and providing said control signals,
a first digital data processing computer included in said first channel,
second and third digital data processing computers included in said second channel,
first cross channel monitoring means for comparing the output of said first channel with the output of said second channel and providing a first comparison signal in accordance with disagreement therebetween,
first substituting means responsive to said first comparison signal for disabling said second computer and substituting said third computer therefor when said first comparison signal indicates disagreement between the outputs of said first and second channels,
first disabling means responsive to said first cross channel monitoring means for disabling said first automatic flight control subsystem when said substitution of said third computer for said second computer does not resolve said disagreement,
a fourth digital data processing computer included in said third channel,
fifth and sixth digital data processing computers included in said fourth channel,
second cross channel monitoring means for comparing the output of said third channel with the output of said fourth channel and providing a second comparison signal in accordance with disagreement therebetween,
second substituting means responsive to said second comparison signal for disabling said fifth computer and substituting said sixth computer therefor when said second comparison signal indicates disagreement between the outputs of said third and fourth channels,
second disabling means responsive to said second cross channel monitoring means for disabling said second automatic flight control subsystem when said substitution of said sixth computer for said fifth computer does not resolve said disagreement,
said first, second, third, fourth, fifth and sixth computers performing identical tasks with respect to each other for providing said control signals in response to said sensor signals,
said first, second and third computers providing dissimilar data processing with respect to each other,
said fourth, fifth and sixth computers providing dissimilar data processing with respect to each other,
said first and fourth computers providing dissimilar data processing with respect to each other,
each of said first, second, third, fourth, fifth and sixth computers being selected from a group consisting of three computers that provide dissimilar data processing with respect to each other,
whereby said automatic flight control system is fail-operational with respect to a first generic fault.

* * * * *